US010915759B2

(12) United States Patent
Green et al.

(10) Patent No.: US 10,915,759 B2
(45) Date of Patent: Feb. 9, 2021

(54) ARRIVAL DETECTION FOR BATTERY-POWERED OPTICAL SENSORS

(71) Applicant: VergeSense, Inc., Mountain View, CA (US)

(72) Inventors: Kelby Green, Mountain View, CA (US); Dan Ryan, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 0 days.

(21) Appl. No.: 16/820,603

(22) Filed: Mar. 16, 2020

(65) Prior Publication Data

US 2020/0293790 A1 Sep. 17, 2020

Related U.S. Application Data

(60) Provisional application No. 62/819,288, filed on Mar. 15, 2019.

(51) Int. Cl.
*G06K 9/00* (2006.01)
*G06T 7/70* (2017.01)
(Continued)

(52) U.S. Cl.
CPC ..... *G06K 9/00771* (2013.01); *G06K 9/00362* (2013.01); *G06K 9/209* (2013.01);
(Continued)

(58) Field of Classification Search
CPC .......... G06K 9/00362; G06K 9/00771; G06K 9/209; G06Q 10/1093; G06T 7/70;
(Continued)

(56) References Cited

U.S. PATENT DOCUMENTS 10,288,307 B2 * 5/2019 Patel ...................... G05B 15/02
10,594,987 B1 * 3/2020 Nixon .................... H04N 5/247
(Continued)

FOREIGN PATENT DOCUMENTS

WO 2017072158 A1 5/2017

OTHER PUBLICATIONS

International Search Report and Written Opinion for International Search Report for International Patent Application No. PCT/US2020/023025, dated Jun. 17, 2020, 13 pages.
(Continued)

*Primary Examiner* — Katrina R Fujita
(74) *Attorney, Agent, or Firm* — Run8 Patent Group, LLC; Alexander R. Flake; Peter Miller

(57) ABSTRACT

A method including, accessing an occupancy of the workspace. The method also includes, in response to the occupancy status indicating vacancy: at a first time, recording a first image and a second image of the workspace, the first image and the second image characterized by a first resolution; and executing an arrival detection model based on the first and second image. The method further includes, in response to detecting arrival at the workspace: at a third time, recording a third image of the workspace, the third image characterized by a second resolution greater than the first resolution; and executing an occupancy detection model based on the third image. The method additionally includes, in response to detecting occupancy of the workspace: updating the occupancy status to indicate occupancy; and transmitting the occupancy status to a remote scheduling system.

19 Claims, 6 Drawing Sheets

(51) Int. Cl.
*G06T 7/00* (2017.01)
*G06K 9/20* (2006.01)
*G06Q 10/10* (2012.01)

(52) U.S. Cl.
CPC ........... *G06Q 10/1093* (2013.01); *G06T 7/70* (2017.01); *G06T 7/97* (2017.01); *G06T 2207/30196* (2013.01); *G06T 2207/30232* (2013.01)

(58) Field of Classification Search
CPC ............. G06T 7/97; G06T 2207/30196; G06T 2207/30232
See application file for complete search history.

(56) References Cited

U.S. PATENT DOCUMENTS

| | | | |
|---|---|---|---|
| 2004/0156530 A1* | 8/2004 | Brodsky | G06K 9/32 382/103 |
| 2008/0008360 A1 | 1/2008 | Pattikonda | |
| 2009/0153655 A1 | 6/2009 | Ike et al. | |
| 2010/0141515 A1 | 6/2010 | Doucet et al. | |
| 2012/0153868 A1 | 6/2012 | Gu et al. | |
| 2014/0093130 A1 | 4/2014 | Dasu et al. | |
| 2017/0076571 A1* | 3/2017 | Borel | G08B 13/19673 |
| 2017/0262779 A1* | 9/2017 | Remaker | H04L 43/0811 |
| 2018/0137369 A1* | 5/2018 | Roth | G06K 9/00228 |
| 2018/0144495 A1* | 5/2018 | Roth | G06K 9/00369 |
| 2018/0233010 A1* | 8/2018 | Modestine | G08B 13/19684 |
| 2018/0288300 A1* | 10/2018 | Crooks | H04N 5/2352 |
| 2018/0324393 A1* | 11/2018 | Ryan | G06K 9/6218 |
| 2019/0043207 A1* | 2/2019 | Carranza | G06T 7/292 |
| 2019/0156496 A1* | 5/2019 | Leduc | H04L 12/66 |

OTHER PUBLICATIONS

Lightsearch, "Occupancy and Vacancy Sensors", (https://www.lightsearch.com/resources/lightguides/sensors.html) Aug. 21, 2017, 4 pages.

Nasa, "Graphical User Interface Development and Design to Support Airport Runway Configuration Management", (https://ntrs.nasa.gov/archive/nasa/casi.ntrs.nasa.gov/20150019724.pdf), Sep. 2015, 73 Pages.

* cited by examiner

ARRIVAL DETECTION FOR
BATTERY-POWERED OPTICAL SENSORS

CROSS-REFERENCE TO RELATED
APPLICATIONS

This application claims the benefit of U.S. Provisional Application No. 62/819,288, filed on 15 Mar. 2019, which is incorporated in its entirety by this reference.

This application is related to U.S. patent application Ser. No. 15/973,445, filed on 7 May 2018, which is incorporated in its entirety by this reference.

TECHNICAL FIELD

This invention relates generally to the field of occupancy monitoring and more specifically to a new and useful method for arrival detection for battery-powered optical sensors in the field of occupancy monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
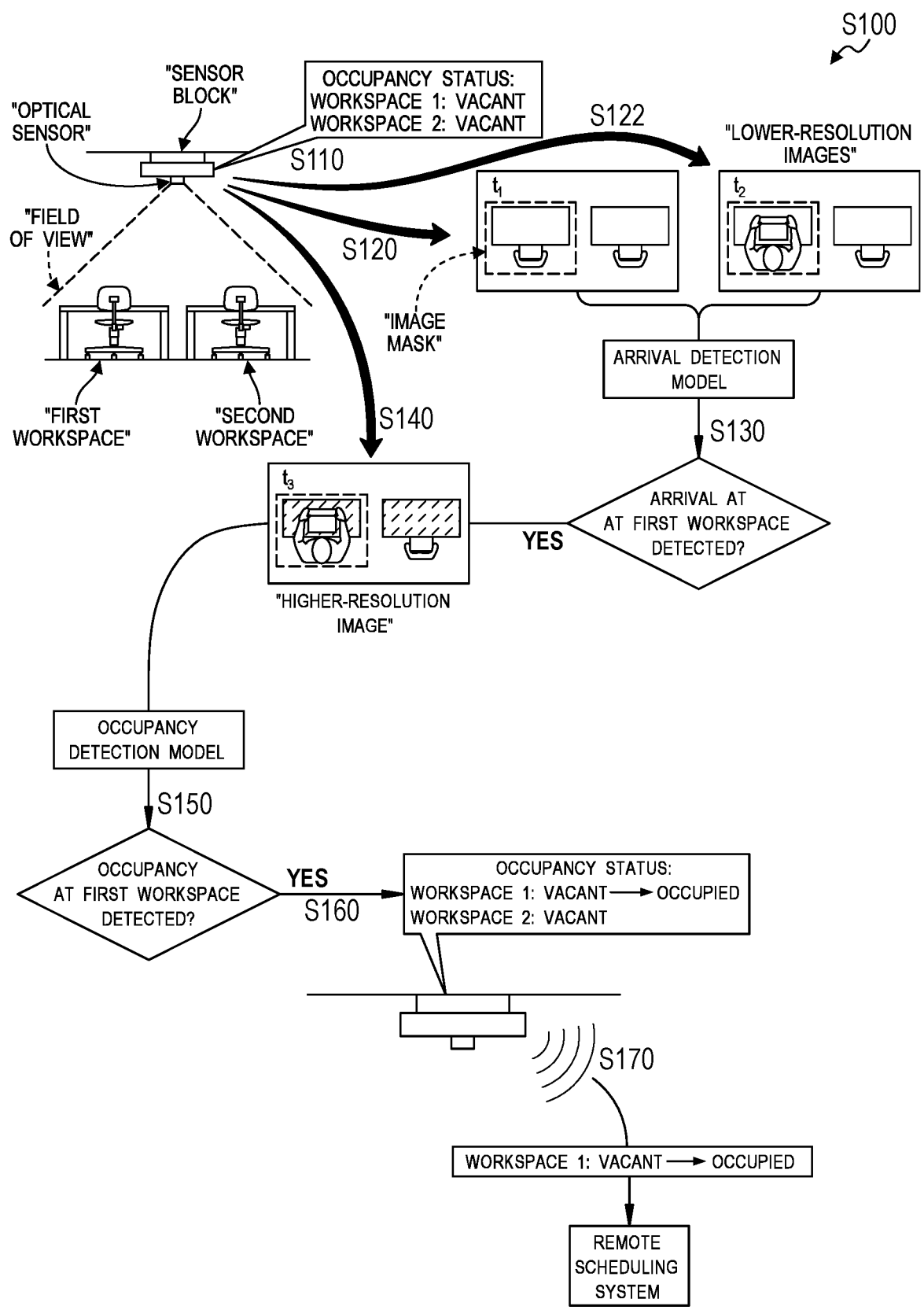
FIG. 1 is a flowchart representation of a method.

As shown in FIG. 1, a method S100 for detecting occupancy of a workspace includes: accessing an occupancy status of the workspace in Block S110. The method S100 also includes, in response to the occupancy status indicating vacancy of the workspace: at a first time, recording a first image of the workspace at a sensor block, the first image characterized by a first resolution in Block S120; at a second time succeeding the first time by a first time interval, recording a second image of the workspace at the sensor block, the second image characterized by the first resolution in Block S122; and executing an arrival detection model based on the first image and the second image in Block S130. The method S100 additionally includes, in response to detecting human arrival at the workspace via the arrival detection model: at a third time, recording a third image of the workspace at the sensor block, the third image characterized by a second resolution greater than the first resolution in Block S140; and executing an occupancy detection model based on the third image in Block S150. The method S100 further includes, in response to detecting occupancy of the workspace via the occupancy detection model: updating the occupancy status to indicate occupancy of the workspace in Block S160; and transmitting the occupancy status to a remote scheduling system in Block S170.

As shown in FIG. 1, a variation of the method S100 for detecting occupancy of a workspace includes: accessing an occupancy status of the workspace in Block S110. This variation of the method S100 also includes, in response to the occupancy status indicating vacancy of the workspace: at a first time, recording a first image of the workspace at a sensor block in Block S120; at a second time succeeding the first time by a first time interval, recording a second image of the workspace at the sensor block in Block S122; and executing an arrival detection model based on the first image and the second image, the arrival detection model characterized by a first energy consumption in Block S130. This variation of the method S100 additionally includes, in response to detecting human arrival at the workspace via the arrival detection model: at a third time, recording a third image of the workspace at the sensor block in Block S140; and executing an occupancy detection model based on the third image, the occupancy detection model characterized by a second energy consumption greater than the first energy consumption in Block S150. This variation of the method S100 further includes, in response to detecting occupancy of the workspace via the occupancy detection model: updating the occupancy status to indicate occupancy of the workspace in Block S160; and transmitting the occupancy status to a remote scheduling system, the occupancy status indicating occupancy of the workspace in Block S110.

Figure 2:
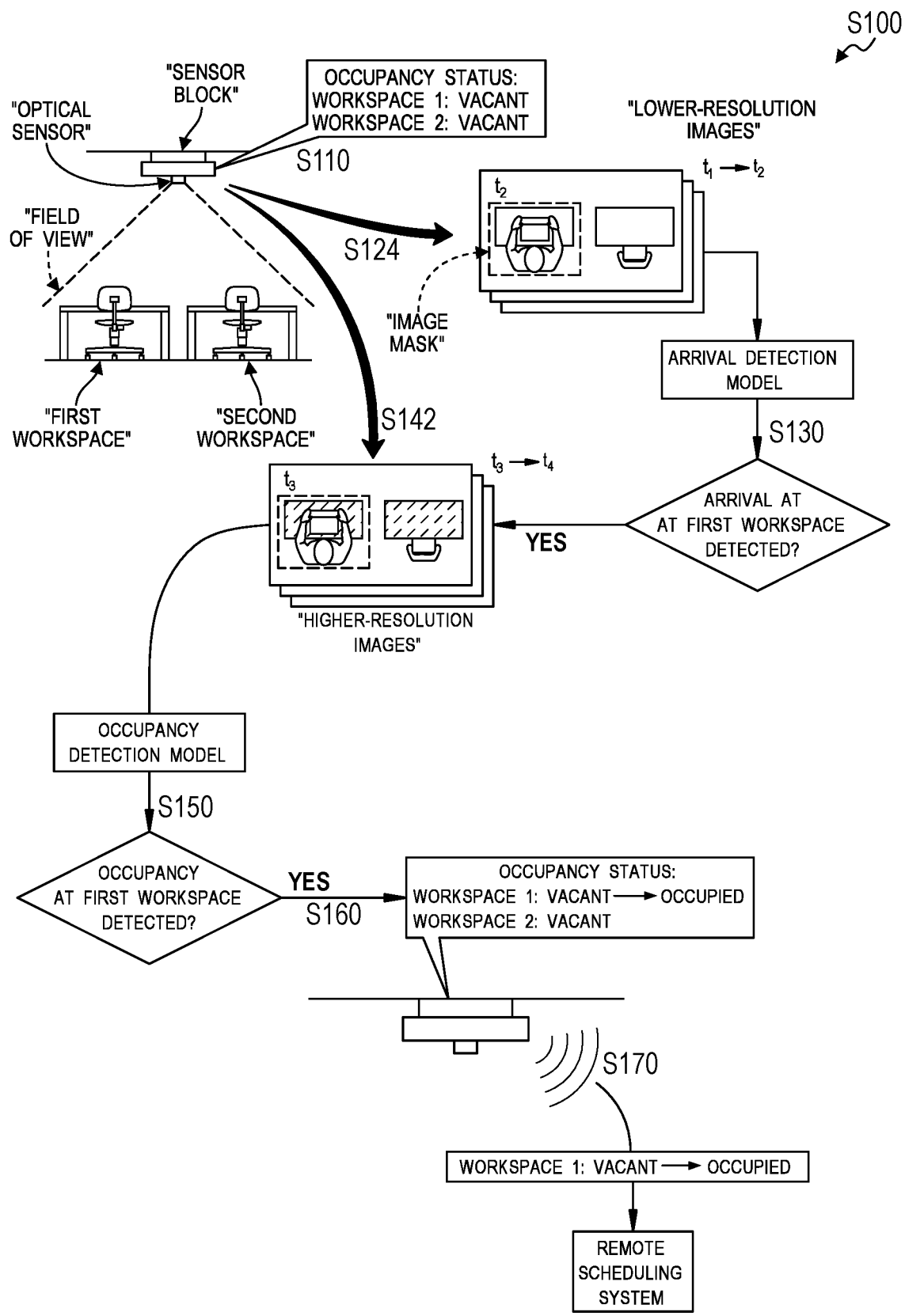
FIG. 2 is a flowchart representation of the method.
Figure 3:
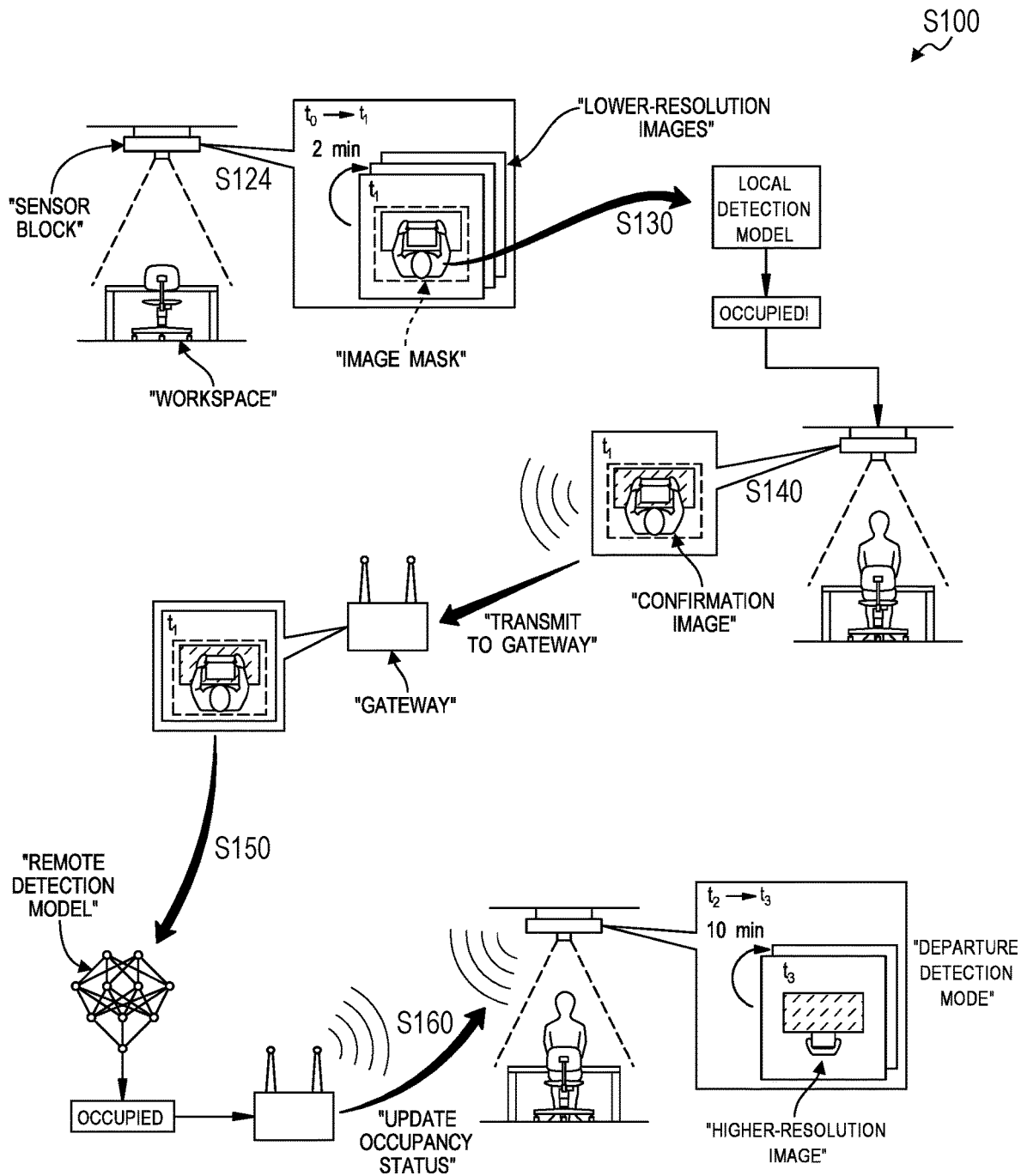
FIG. 3 is a flowchart representation of the method.

As shown in FIG. 2, a variation of the method S100 for detecting occupancy of a workspace includes: accessing a first occupancy status of a first workspace in Block S110. This variation of the method S100 also includes, in response to the first occupancy status indicating vacancy of the first workspace: during a first time period, recording a first series of images of the first workspace at a sensor block and at a first imaging frequency in Block S124; and executing an arrival detection model based on the first series of images in Block S130. This variation of the method S100 additionally includes, in response to detecting human arrival at the first workspace via the arrival detection model: during a second time period succeeding the first time period, recording a second series of images of the first workspace at the sensor block and at a second imaging frequency in Block S142; and executing an occupancy detection model based on the second series of images in Block S150. This variation of the method S100 further includes, in response to detecting occupancy of the first workspace via the occupancy detection model: updating the first occupancy status to indicate occupancy of the first workspace in Block S160; and transmitting the first occupancy status to a remote scheduling system in Block S110.

2. Applications

Generally, As shown in FIGS. 1, 2, 3, 4, and 5, the method S100 can be executed within a work area—such as within a conference room, an agile work environment, a cafeteria, or a lounge, etc. within a facility—to monitor changes in human occupancy in the work area and to update schedulers or managers regarding occupancy status of assets and workspaces (i.e. a "space")—such as a desk, cubicle, or another seat location within the work area. As shown in FIG. 6, Blocks of the method S100 can be executed by a system including: a sensor block deployed at the work area, a gateway wirelessly connected to the sensor block, and/or a remote scheduling system for communicating occupancy data pertaining to the work area to users of the system.

In particular, a sensor block can include an optical sensor (e.g., a camera) and can be configured to mount to a wall, ceiling, or other surface such that the field of view of the optical sensor faces a work area. For example, the sensor block can be arranged overhead and facing downward over a conference table in a conference room or arranged overhead and facing downward over a cluster of desks in an agile work environment within the facility. Furthermore, the sensor block can be battery-powered and therefore executes Blocks of the method S100 in order to limit energy consumption while monitoring occupancy of the work area, thereby extending battery life of the sensor block.

When detecting occupancy of a workspace within a work area, the system can execute Blocks of the method S100 in order to prioritize precise temporal detection of an arrival of a human at a workspace (thereby indicating that the workspace is newly occupied), while deprioritizing precise temporal detection of a human's departure from a workspace (thereby indicating that the workspace is newly available). This asymmetrical prioritization improves resource management efficiency by reducing the probability that a user of the system travels to what the system has indicated to be an unoccupied workspace only to discover that the system did not detect that the workspace had been recently occupied. Thus, the system can execute the method S100 to: detect arrival of humans at workspaces with high temporal and spatial precision; and detect departure of humans from workspaces with high spatial precision but lower temporal precision in order to extend battery life of the sensor block.

Accordingly, by executing Blocks of the method S100, the sensor block can: operate in an arrival detection mode when at least one workspace in the field of view of the sensor block is vacant; and operate in a departure detection mode when all workspaces in the field of view of the sensor block are occupied. Furthermore, if some workspaces in the field of view of the sensor block are occupied while other workspaces in the field of view of the sensor block are vacant, the sensor block can operate in a hybrid detection mode. For example, the sensor block can: record and process segments of images depicting unoccupied workspaces in the field of view of the sensor block according to the arrival detection mode; and record and process segments of images depicting occupied workspaces in the field of view of the sensor block according to the departure detection mode.

In particular, while operating in the arrival detection mode, at the sensor block, the system can: record successive lower-resolution images of the workspace at a higher frequency (e.g., separated by a one minute or two minute time interval); detect arrival of a human at the workspace via an arrival detection model based on at least the last image of the successive lower-resolution images; and, in response to detecting the arrival of a human at the workspace, record a higher-resolution confirmation image. The system can execute an arrival detection model that is characterized by a low energy consumption and low storage footprint such that the system can execute the arrival detection model at a high frequency without rapidly depleting the battery of the sensor block.

Upon detection of arrival of a human at the workspace based on the arrival detection model, the system can then confirm occupancy of the workspace via an occupancy detection model based on the confirmation image and update an occupancy status of the workspace to indicate that the workspace is occupied. Alternatively, the system can detect, via the occupancy detection model that the system detected a false positive for human arrival at the workspace and can maintain the occupancy status of the workspace to indicate that the workspace is still vacant.

Therefore, when operating in the arrival detection mode, the sensor block can conserve battery energy by capturing lower-resolution images and executing (via the arrival detection model) low-compute, on-board processing of the images until the sensor block detects an arrival of the human. The system can then maintain the precision of the arrival detection by capturing lower-resolution images at a higher frequency (thereby providing better time resolution for arrival detection) and confirming changes in occupancy detected via the arrival detection model by recording a higher-resolution confirmation image at the sensor block and executing a more accurate, higher compute occupancy detection model.

While operating in the departure detection mode, the sensor block can record successive higher-resolution images of the workspace at a lower frequency (e.g., separated by a 10-, 15-, or 20-minute time interval). The system can then: detect whether the workspace is newly vacant via the occupancy detection model; and, in response, update the workspace status to indicate that the workspace is vacant. Therefore, when operating in the departure detection mode, the sensor block extends battery life by increasing the time interval between images (thereby reducing the time resolution of departure detection) but still maintains accuracy by only indicating a vacancy when detected by the more accurate occupancy detection model at the gateway. In one implementation, the system can execute the high-compute occupancy detection model at a gateway (connected to a wall outlet or other non-portable power source) communicating with multiple sensor blocks by: transmitting each higher-resolution image to the gateway; at the gateway, executing the occupancy detection model on the high-resolution image; and transmitting the occupancy status classified via the occupancy detection model back to the sensor block that is recording images of the workspace.

Furthermore, the system can operate in a hybrid detection mode in response to the system detecting both occupied and vacant workspaces within the field of view of the sensor block. For example, the sensor block can record images at a higher frequency (e.g., on a two-minute time interval), including a sequence of (e.g., four successive) lower-resolution images followed by one higher-resolution image. Therefore, the sensor block records an image every two minutes while recording a higher resolution image every ten minutes. The system can thus evaluate the lower-resolution images according to the arrival detection mode (e.g., by triggering capture and transmission of a higher-resolution image to the gateway upon detection of arrival of a human in the workspace) while confirming the occupancy status of the workspaces on a ten-minute interval via the occupancy detection model. While in this hybrid detection mode, the system can implement a cumulative limit on high-resolution image transmitted to the gateway within a period of time (e.g., including planned higher-resolution image transmissions and those triggered by arrival detection via the arrival detection model), such that the sensor block limits energy consumption during periods of high activity (e.g., periods of time that include many arrivals and departures from workspaces in the work area) and thus extends battery life.

Furthermore, the system can generate and/or calculate setting updates or other feedback to the sensor block to tailor the arrival detection model—implemented by the sensor block—to improve spatial accuracy, asymmetric temporal accuracy, and/or energy efficiency of sensor block. For example, the system can access image masks, thresholds, template images, and/or contiguous edges, and the sensor block can update the arrival detection model based on these data. In another example, the system can calculate: a minimum resolution for lower-resolution images recorded by the sensor block; and/or specify a particular arrival detection model for execution at the sensor block that is most accurate for the specific characteristics of the sensor block.

Once the system has detected and confirmed a change in occupancy of a workspace, the system can notify a remote scheduling system of the change in occupancy status of the workspace. The remote scheduling system can then update the occupancy status of the workspace and adjust scheduling, utilization, and/or other records for the workspace accordingly. Additionally, the remote scheduling system can update a graphic user interface (hereinafter a "GUI") communicating the occupancy status of each workspace in the work area, thereby providing users of the system with an overall view of the occupancy in the work area. Furthermore, the remote scheduling system can display a particular graphical representation in the GUI indicating the detection of a human arrival at a workspace prior to confirmation of this arrival as occupancy of the workspace. The system can, therefore, graphically distinguish between unconfirmed and confirmed occupancy at workspaces in the work area.

The method S100 is generally described herein as executed by one sensor block, one gateway, and/or a remote scheduling system deployed to a facility. However, the gateway can similarly interface with any other number of sensor blocks—executing Blocks of the method S100—deployed throughout the facility; and the remote scheduling system can interface with any other number of gateways and any other number of sensor blocks in the facility.

3. Sensor Block

As shown in FIG. 6, the system can include a sensor block that can further include: an optical sensor defining a field of view within a work area that encompasses at least one workspace; a sensor block processor configured to extract data from images recorded by the optical sensor; a wireless communication module configured to wirelessly transmit and receive images and/or other data from other sensor blocks in a set of sensor blocks installed in a work area, a gateway, and/or a remote scheduling system; a battery configured to power the optical sensor, the sensor block processor, and the wireless communication module over an extended duration of time (e.g., one year, five years); and an housing configured to contain the optical sensor, the sensor block processor, the wireless communication module, and the battery, configured to mount to a surface (e.g., a ceiling above the work area or a wall) such that the field of view of the optical sensor encompasses a workspace or a set of workspaces in the work area of interest within the facility (e.g., a conference table within a conference room, a cluster of agile desks in an agile work environment).

The optical sensor can include: a color camera configured to record and output 2D color images; and/or a depth camera configured to record and output 2D depth images or 3D point clouds. In one implementation, the optical sensor can capture images (or 3D point clouds) at multiple resolutions and/or color settings (grayscale, full color, etc.). Alternatively, the sensor block can include two optical sensors: a high-resolution optical sensor configured to capture higher-resolution 2D images or 3D point clouds of the work area for processing via the occupancy detection model; and a lower-resolution optical sensor configured to capture lower-resolution 2D images for processing via the arrival detection model. Thus, the sensor block can: at a first time, record a first (lower-resolution) image of the workspace at the sensor block via a first optical sensor in Block S120; at a second time succeeding the first time by a first time interval (where the first time interval is based on the higher imaging frequency for the lower-resolution images), record a second image of the workspace at the sensor block via the first optical sensor in Block S122; at a third time, record the third (high-resolution confirmation) image of the workspace at the sensor block via a second optical sensor in Block S140; and/or, at a fourth time succeeding the third time by a second time interval (where the second time interval is based on the lower imaging frequency for the high-resolution images), record a fourth (high-resolution) image at the sensor block via the second optical sensor. However, the optical sensor can define any other type of optical sensor and can output visual or optical data in any other format.

In a local execution variation, the sensor block can locally execute Blocks of the method S100, as described herein, to: record successive lower-resolution images of the workspace at a higher frequency; detect an arrival of a human at the workspace via an arrival detection model based on at least the last image of the successive lower-resolution images; in response to detecting the arrival of a human at the workspace, record a higher-resolution confirmation image; and execute the occupancy detection model to confirm occupancy and/or reject the arrival detection of the arrival detection model. Additionally, the sensor block can locally execute Blocks of the method S100, as described herein, to: record successive higher-resolution images of the workspace at a lower frequency while in departure detection mode. Thus, the system can: access the occupancy status of the workspace, in local memory of the sensor block in Block S110; execute the arrival detection model based on the first image and the second image at the sensor block in Block S130; execute the occupancy detection model based on the third image at the sensor block in Block S150; update the occupancy status to indicate occupancy of the workspace in the local memory of the sensor block in Block S160; and transmit the occupancy status from the sensor block to the remote scheduling system in Block S170.

In one example, the sensor block can include an optical sensor defining a maximum resolution of 640 by 480 and a minimum resolution of 256 by 256 with a field of view of Z degrees. Thus, the lower-resolution images recorded by the sensor block can be characterized by a resolution of 256 by 256 and the higher resolution images can be characterized by a resolution of 640 by 480. Additionally, the sensor block can include an optical sensor defining a maximum resolution less than a threshold resolution sufficient to identify humans (e.g., by distinguishing facial features). Therefore, the sensor block can anonymously detect the arrival and/or presence of a human at a workspace.

The sensor block can include the optical sensor, the motion sensor, the battery, the processor, and the wireless communication module arranged within a single housing configured to install on a flat surface—such as by being adhered or mechanically fastened to a wall or ceiling—with the field of view of the optical sensor facing outwardly from the flat surface and encompassing a region of the work area within the facility.

4. Gateway

As shown in FIG. 6, in one variation, the system can also include a gateway including a gateway processor and a gateway wireless communication module and configured to:

receive images transmitted from sensor blocks nearby via a wireless communication protocol or via a local ad hoc wireless network; to confirm or detect the presence of a human at a workspace based on images received from sensor blocks. For example, the gateway can be installed near and connected to a wall power outlet and can execute a more computationally intensive occupancy detection model than the sensor block. Furthermore, multiple gateways can be installed throughout the facility and each of these gateways can interface with many sensor blocks installed nearby to collect images (and/or image data) from these sensor blocks.

In an alternative remote execution variation, the system can record a set of higher-resolution images while in departure detection mode or upon recording a confirmation image in response to detecting a human arrival at a workspace; and transmit each higher-resolution image to the gateway. In this variation, the gateway can execute the high-compute occupancy detection model in order to further reduce energy consumption by the sensor block (assuming the energy required to transmit the high-resolution images is sufficiently low, when compared to the energy consumption of each execution of the occupancy detection model. Thus, the system can: access an occupancy status of the workspace at the sensor block in Block S110; execute the arrival detection model based on the first (lower-resolution) image and the second (lower-resolution) image at the sensor block in Block S130; in response to detecting human arrival at the workspace via the arrival detection model, transmit the third image from the sensor block to a gateway; execute the occupancy detection model based on the third (high-resolution) image at the gateway in Block S150; in response to detecting occupancy of the workspace via the occupancy detection model, transmit an indication of occupancy of the workspace from the gateway to the sensor block; update the occupancy status to indicate occupancy of the workspace at the sensor block in Block S160; and transmit the occupancy status from the gateway to the remote scheduling system in Block S170.

In one implementation, the gateway can execute a remote occupancy detection model, which requires additional computational power than the local occupancy detection model executed on the sensor block. More specifically, the system can: at the sensor block, execute a local occupancy detection model based on a high-resolution image of the workspace; in response to detecting occupancy with less than a threshold confidence at the sensor block, transmit the high-resolution image of the workspace from the sensor block to the gateway; at the gateway, execute a remote occupancy detection model based on the high-resolution image; and, in response to detecting occupancy at the workspace, transmit an indication of occupancy of the workspace to the sensor block and/or the remote scheduling system.

5. Workspace Status and Corresponding Detection Modes

The system executes Blocks of the method S100 in order to detect statuses of workspaces within the field of view of the optical sensor of the sensor block and to establish a current mode (or "state") of operation of the sensor block based on statuses of these workspaces. Generally, a sensor block can be installed over a work area occupied by multiple desks and/or seats. The sensor block can detect (e.g., within the field of view of the sensor block) each desk and/or seat within the work area (e.g., at the gateway) via computer vision algorithms and designate each detected desk and/or seat as a workspace within the work area upon setup of the sensor block. Alternatively, administrators of the system can designate locations of workspaces within the field of view of the sensor block during setup of the sensor block in the work area. More specifically, the system can: detect and/or access a set of distinct regions in the field of view of the optical sensor, each region corresponding to a workspace in the field of view of the optical sensor; and define an image mask corresponding to pixel locations in the field of view of the optical sensor corresponding to each detected workspace. Thus, the sensor block can restrict execution of the arrival detection model and/or the occupancy detection model to particular image masks corresponding to workspaces in the field of view of the optical sensor, thereby improving the efficiency of both models and minimizing false-positives caused by humans moving between or around workspaces in the field of view of the optical sensor.

In particular, upon setup over a work area (e.g., at a time when the work area is confirmed vacant), the system can: record a high-resolution image of the work area via the sensor block's optical sensor; transmit the high resolution image to the gateway; and receive from the gateway an image mask indicating a set of pixels in the field of view of the optical sensor corresponding to each workspace in the image. Correspondingly, the gateway can automatically detect distinct workspaces in the image or receive a manual indication of the workspaces within the image via an interface and input from an administrator of the system.

Upon designation of each workspace in the field of view of the sensor block, the sensor block can store, in local memory, a current occupancy status (e.g., a binary variable or categorical variable) of each workspace within its field of view. The occupancy status of each workspace indicates the system's current evaluation of whether the workspace is currently occupied or currently vacant. The sensor block can operate in an arrival detection mode, a departure detection mode, or a hybrid detection mode in response to the occupancy statuses of the workspaces within its field of view or the occupancy statuses of all workspaces in the work area.

In order to maximize the amount of time that the sensor block spends in a low-power mode, the sensor block can: set timers to periodically wake itself from low-power mode in order to capture lower-resolution images and execute the arrival detection model (in arrival detection mode) and/or capture and transmit higher-resolution images to the gateway (in departure detection mode or when confirming arrival of a human at a workspace).

In one implementation, the sensor block can operate in an arrival detection mode while a subset of the workspaces in the field of view of the optical sensor are vacant or in a departure detection model when all of the workspaces in the field of view of the optical sensor are occupied.

In another implementation, the sensor block can operate in an arrival detection mode while all of the workspaces within its field of view are vacant; in a departure detection mode while all of the workspaces within its field of view are occupied; and in a hybrid detection mode while some workspaces within its field of view are occupied and other are vacant. Thus, the mode of operation of the sensor block depends on the current occupancy of the workspaces within the field of view of the sensor block.

In yet another implementation, the sensor block can operate in an adaptive mode, where the frequency of recording lower-resolution images followed by execution of the arrival detection model relative to the frequency of recording high-resolution images followed by execution of the occupancy detection model is adaptive based on the time of day, the proportion of desks currently occupied within the work area, and/or the confidence level for the occupancy status of a desk.

In instances where the sensor block is installed over a work area with only one workspace within the field of view of the sensor block, the sensor block can operate in arrival detection mode in response to a vacancy in this workspace or departure detection mode in response to occupancy in this workspace.

More specifically, while operating in arrival detection mode, the system can: execute the arrival detection model based on a first (lower-resolution) image and a second (lower-resolution) image, where the arrival detection model characterized by a first energy consumption; and, while operating in departure detection mode, execute the occupancy detection model based on a third (high-resolution) image, where the occupancy detection model characterized by a second energy consumption is greater than the first energy consumption.

6. Arrival Detection Mode

As shown in FIGS. 1, 2, 3, and 5, the system can execute Blocks S110, S120, S122 and S130, when operating in arrival detection mode to: access an occupancy status of a workspace in Block S110; record successive lower-resolution images of a workspace at a high frequency in Blocks S120, S122, and S124; detect an arrival of a human at the workspace via an arrival detection model based on at least the last image of the successive lower-resolution images in Block S130; and in response to detecting the arrival of a human at the workspace, record a higher-resolution confirmation image in Block S140; and confirm occupancy of the workspace via the occupancy detection model in Block S150. Thus, in the arrival detection mode, the system can improve the arrival time resolution of the system by increasing the frequency of lower-resolution capture and by recording high-resolution as confirmation of occupancy.

6.1 Lower-Resolution Image Capture

Generally, while in arrival detection mode, the sensor block captures a sequence of lower-resolution images in order to analyze each image to detect new occupancy of any vacant workspace in the field of view of the sensor block in Block S120, S122, and S124. More specifically, the sensor block can record lower-resolution images (e.g., 256 by 256 pixels) at a frequency as determined by an internal clock of the sensor block. The frequency can be predetermined (e.g., once every minute, two minutes, or three minutes) or can vary depending on the time of day, day of the week, historical utilization of the work area within the field of view of the sensor block, etc. Furthermore, the sensor block can periodically synchronize its clock with the gateway based on standard time synchronization protocols to time the capture of the lower-resolution images.

In one variation, in Block S120, the sensor block can record a first lower-resolution image in a pair of lower-resolution images, on which the system can execute the arrival detection model. In Block S122, the sensor block can record a second lower-resolution image in the pair of lower-resolution images. The system can then execute the arrival detection model based on the first image and the second image, which can be the last two images in a series of lower-resolution images. More specifically, the system can: at a first time, record a first image of the workspace at a sensor block, the first image characterized by a first resolution; and, at a second time succeeding the first time by a first time interval, record a second image of the workspace at the sensor block, the second image characterized by the first resolution. Thus, the sensor block can record consecutive images, both at a lower resolution, separated by a first time interval of a duration based on desired arrival time resolution for the system. For example, if the desired arrival time resolution is one minute, then the first time interval is equal to one minute.

In another variation during a first time period, the system can: record a first series of (lower-resolution) images of the first workspace at a sensor block and at a first imaging frequency in Block S124; and execute the arrival detection model based on the first series of images of the workspace. In this implementation, the first imaging frequency corresponds to the desired arrival time resolution of the system. Additionally, the sensor block can successively execute the arrival detection model for each image in the series of (lower-resolution) images of the workspace or for each consecutive pair of (lower-resolution) images of the workspace.

In one implementation, the sensor block can capture lower-resolution images at the predetermined or adaptive frequency until the sensor block detects new occupancy (e.g., an arrival) of a human according to the arrival detection model. Alternatively, the sensor block can periodically capture a higher-resolution image of the work area and transmit the higher-resolution image to the gateway to verify that all workspaces within the field of view of the sensor block remain vacant.

6.2 Arrival Detection Model

Generally, the sensor block executes the arrival detection model in Block S130 of the method S100 in order to detect new occupancy of a workspace within the field of view of the sensor block. In particular, the system can execute an arrival detection model based on the first (lower-resolution) image and the second (lower-resolution) image, the arrival detection model characterized by a first energy consumption. The sensor block executes an arrival detection model, which can be a low-compute and low memory utilization computer vision classification algorithm in order to reduce battery energy consumption for each execution of the arrival detection model such that the system can execute the arrival detection model at a high-frequency to improve the arrival time resolution of the system. More specifically, the sensor block executes an arrival detection model that can take as input the last image in the sequence of lower-resolution images or the last two images in the sequence of lower-resolution images; and classifies the image or images to determine whether a human has arrived at a workspace in the image or whether the workspace remains vacant. In various implementations, the sensor block can execute arrival detection models including absolute image thresholding, difference image thresholding, contiguous edge detection, and/or template image comparison.

In implementations where the sensor block executes the arrival detection model on the last two low-resolution images recorded at the sensor block, the system can execute the arrival detection model based on a difference image between the most recent of the two images and earlier of the two images. Thus, the sensor block can: calculate a difference image based on a first (lower-resolution) image and a second (lower-resolution) image; and execute the arrival detection model based on the difference image. Additionally or alternatively, the sensor block can execute the arrival detection model based on a difference image calculated based on a most recent lower-resolution image and a template image of the workspace while vacant. More specifically, the sensor block can: access a template image of the workspace; generate a first difference image between the template image and the first image; detect a human arrival in the workspace based on the first difference image; generate a second difference image between the template image and the second image; and confirm the human arrival in the workspace based on the second difference image. Thus, the sensor block can: calculate a difference image based on a most-recent lower-resolution image of the workspace and a template image of the workspace; and execute the arrival detection model based on this difference image.

In one implementation, the sensor block inputs a subset of the pixels of each input lower-resolution image as defined by an image mask corresponding to a particular workspace being evaluated. More specifically, the sensor block can: access an image mask corresponding to the workspace, the image mask defining a subsection of the image occupied by the workspace; and execute the arrival detection model based on the first (lower-resolution) image within the image mask and the second (lower-resolution) image within the image mask. For example, a first workspace in the field of view of the sensor block can correspond to a first image mask defining a first subset of pixels in each lower-resolution image while a second workspace in the field of view of the sensor block can correspond to a second image mask defining a second subset of pixels in each lower-resolution image. Thus, the sensor block can execute the arrival detection model for each workspace in the field of view of the sensor block and for each lower-resolution image recorded at the sensor block.

In another implementation, in addition to detecting human arrival at the workspace via the arrival detection model, the sensor block can also calculate a confidence score in the sensor block's assessment of human arrival at the workspace via the arrival detection model. For example, the sensor block can execute an arrival detection model that outputs: a classification indicating whether a human has arrived at a workspace or whether the workspace remains vacant; and a confidence score in this classification. Thus, the sensor block can, via the arrival detection model and based on a confidence score of human arrival or continued vacancy at the workspace, conditionally (e.g., in response to a confidence score less than a threshold confidence score) trigger execution of the higher-compute occupancy detection model in order to resolve uncertainty in the classification output by the arrival detection model.

In yet another implementation, the sensor block can execute an arrival-departure detection model that can: while a workspace is vacant, detect human arrival or continued vacancy of the workspace; while the workspace is occupied, detect continued occupancy; or detect human departure from the workspace. Thus, in this implementation, the sensor block can execute a low-compute arrival-departure detection model that can detect both possible changes in occupancy status for a workspace. In this implementation, the sensor block can trigger recording of a higher-resolution image and execution of the higher-compute occupancy detection model in response to a confidence score output by the arrival-departure detection model in association with a classification that is less than a threshold confidence score or based on a fixed schedule to periodically obtain more detailed contextual data related to the workspace. In one example of this implementation, the sensor block can execute an arrival-departure detection model including two separate models: an arrival detection model and a departure detection model. Therefore, the sensor block can execute the arrival detection model in response to a current occupancy status of a workspace indicating vacancy of the workspace and execute the departure detection model in response to the current occupancy status of the workspace indicating occupancy of the workspace.

Further implementations of the arrival detection model are described below. However, the sensor block can execute an arrival detection model that includes a combination of the implementations described below.

6.2.1 Thresholding

In one implementation, the sensor block can execute the local detection algorithm in the form of a thresholding algorithm. More specifically, the sensor block can, in response to a set of pixel values in an image mask corresponding to the workspace in the second image exceeding a first set of pixel value thresholds, detect human arrival at the workspace. Thus, the sensor block can execute a low-compute thresholding model at a high frequency in order to detect arrival of a human at a workspace within the field of view of the sensor block with greater arrival time resolution.

The sensor block can access input pixels directly from a lower-resolution image (via an image mask corresponding to the workspace) or can derive the input pixels by calculating a difference image of a last lower-resolution image in a series of lower-resolution images and a preceding lower-resolution image in the series of lower-resolution images. Alternatively, the sensor block can access pixels from a difference image calculated based on a most recent lower-resolution image and a template image of the workspace.

In this implementation, the sensor block can input a set of pixels of an input lower-resolution image corresponding to a particular workspace and determine if the color (or grayscale) values of the pixels exceed (or are less than) a set of threshold values. In one example, the sensor block can compare each input pixel to a threshold corresponding to that particular pixel as defined by the image mask. The sensor block can indicate the arrival of a human at a workspace based on a cumulative proportion of a set of input pixels that exceed their corresponding thresholds or the cumulative magnitude of the amount by which each of the input pixels exceeds its corresponding threshold.

In another example, the sensor block can store, in local memory, the set of thresholds corresponding to each of the set of input pixels from each lower-resolution image recorded by the sensor block. Alternatively, instead of a greyscale threshold, the sensor block can store a color region that defines a subset of color values corresponding to continued vacancy of the workspace. In this alternative example, the sensor block can detect human arrival at a workspace in response to a threshold number of pixels being characterized by a color value outside of their corresponding color regions.

6.2.2 Contiguous Edge Detection

In another implementation, the sensor block can execute the arrival detection model in the form of a contiguous edge detection algorithm. Generally, in this implementation, the sensor block: scans an input image over a region of interest corresponding to a workspace in the image (e.g., within the image mask of the workspace) in an input lower-resolution image (or difference image between the two latest lower-resolution images in a set of successive lower-resolution images); executes an edge detection algorithm within the region of interest to identify edges within the region; and correlates the presence or absence of edges within the region of interest with continued vacancy or new occupancy of a workspace corresponding to the set of contiguous input pixels. More specifically, the sensor block can: detect a presence of the first contiguous edge in a first (lower-resolution) image; and, in response to detecting an absence of the first contiguous edge in the second image, detect human arrival at the workspace. Thus, the sensor block can execute a low-compute edge detection model on a pair of lower-resolutions at a high frequency in order to detect arrival of a human at a workspace within the field of view of the sensor block with greater arrival time resolution.

In one implementation, the sensor block can store, in local memory, a set of template edges detected in a template image of the workspace, where the template image depicts the workspace while vacant. The sensor block can then: compare a set of edges detected in a most recent lower-resolution image of the workspace with the set of template images; and, in response to detecting different edges than the set of template edges, detecting human arrival at the workspace.

6.2.3 Low-Compute Artificial Neural Network

In one implementation, the sensor block can execute an artificial neural network as the arrival detection model in order to detect human arrival at a workspace in the field of view of the sensor block. More specifically, the sensor block can input a first (lower-resolution) image and a second (lower-resolution) image to an artificial neural network (e.g., a convolutional neural network for singular inputs or a long short-term memory neural network for a sequence of input images). In this implementation, the sensor block can execute an artificial neural network as the arrival detection model characterized by fewer nodes and therefore fewer weights and computational steps when compared to the occupancy detection model. Thus, the sensor block can repeatedly execute a low-compute artificial neural network at a high frequency in order to improve the arrival time resolution of the sensor block.

In this implementation, the sensor block can execute an artificial neural network that has been pretrained on a corpus of arrival training examples, where each arrival training example includes a pair of consecutive lower-resolution images and a label indicating whether the pair of consecutive lower-resolution images depicts an arrival of a human at the workspace or continued vacancy of the workspace. The system or a training system cooperating with the system can then execute a supervised learning algorithm (e.g., a back-propagation algorithm) in order to train the artificial neural network. The sensor block can then store trained weights of the artificial neural network in local memory in order to execute the arrival detection model upon recording successive images of the workspace.

6.3 Confirmation Image Capture

In response to detecting that a human has arrived at a previously vacant workspace via the arrival detection model based on a last lower-resolution image, the sensor block can record a higher-resolution confirmation image (e.g., 640 by 480 pixels) via the optical sensor in Block S140. More specifically, the sensor block can, in response to detecting human arrival at the workspace via the arrival detection model: record a third (higher-resolution) image of the workspace at the sensor block, the third image characterized by a second resolution greater than the first resolution in Block S140. Thus, by triggering the recording of a higher-resolution image and subsequent execution of the high-compute occupancy detection model, in response to the output of the low-compute arrival detection model, the system can conserve battery energy of the sensor block while still maintaining accuracy of the occupancy classification and a high degree of arrival time resolution for the workspace within the field of view of the sensor block.

In implementations where the sensor block includes a single optical sensor, the sensor block can transition the optical sensor from low-resolution recording setting of the optical sensor to a high-resolution recording setting of the optical setting prior to recording a third (higher-resolution) image and subsequent to recording the first (lower-resolution) image and the second (lower-resolution) image. Thus, the sensor block can record both types of images via a single optical sensor.

In implementations where the sensor block includes two optical sensors, the sensor block can: record the first (lower-resolution) image and the second (lower-resolution) image at a first lower-resolution, lower-power optical sensor in Block S120 and S122; and record the third (higher-resolution) confirmatory image with a second higher-resolution, higher-power optical sensor. Thus, the sensor block can further reduce energy consumption by utilizing a specialized lower-power optical sensor when recording lower-resolution images.

In one implementation, the sensor block can store separate high-resolution and low-resolution image masks, which respectively identify an image mask (e.g., a set of pixels) corresponding to the workspace within the field of view of the optical sensor or optical sensors of the sensor block in order to identify the region occupied by the workspace within both higher-resolution and lower-resolution images. More specifically, the sensor block can execute the occupancy detection model based on the third (higher-resolution) image within an image mask corresponding to the workspace. Thus, the sensor block can reduce energy consumption of the occupancy detection model in addition to reducing the energy consumption of the arrival detection model by limiting the number of input pixels to each model to those input pixels within the image mask corresponding to the workspace.

In the remote execution variation, the sensor block can transmit the higher-resolution image from the sensor block to the gateway by: waking from low-power or hibernation mode to activate the wireless communication module; transmitting the higher-resolution image via the wireless communication model; receiving confirmation from the gateway that the higher-resolution image has been received; receiving confirmation of the occupancy of the workspace and/or and updated model parameters for the arrival detection model; updating the occupancy status of the workspace and/or integrate the updated model parameters into the arrival detection model; and disabling the wireless communication module in order to return to low-power mode. Thus, in variations of the system where communication from the sensor block to the gateway is less energy intensive than executing the occupancy detection model locally, the system can offload the higher-resolution image to the gateway, which can then provide confirmation as to the occupancy or vacancy of the workspace.

6.4 Occupancy Detection Model

Generally, the system executes the occupancy detection model based on the higher-resolution confirmation image in order to classify the presence or absence of humans within the workspace in the field of view of the sensor block with a higher degree of accuracy than can be provided by the low-compute arrival detection model. More specifically, the system can execute an occupancy detection model based on the third (higher-resolution) image, the occupancy detection model characterized by a second energy consumption greater than the first energy consumption in Block S150.

After the system executes the occupancy detection model, the system outputs a classification (e.g., vacant or occupied) for the workspace within the field of view of the sensor block. If the system classifies a workspace as occupied, thereby confirming detection of human arrival by the arrival detection model, then the system updates the occupancy status to indicate occupancy of the workspace in Block S160. If the system classifies the workspace as vacant, then the sensor block has detected a false positive occupancy of the workspace and, therefore, the sensor block does update the occupancy status of the workspace and the occupancy status of the workplace continues to indicate vacancy of the workspace. More specifically, the system can: in response to detecting human arrival at the workspace via the arrival detection model, record a series of (high-resolution) images of the workspace at the sensor block at a second imaging frequency (for recording the higher-resolution images) less than the first image frequency (for recording the lower-resolution images) and executing the occupancy detection model based on the fourth series of images; and, in response to detecting vacancy of the workspace, maintain the occupancy status of the workspace to indicate vacancy of the workspace and record successive (low resolution) images of the workspace at the sensor block and at the first imaging frequency. Thus, the system treats the classification of the occupancy detection model as a "ground truth" for the arrival detection model.

Additionally, upon classifying the occupancy status of the workspace, the system can transmit the occupancy status of the workspace to a remote scheduling system in order to indicate to users, via a GUI, whether the workspace is currently occupied or vacant.

Generally, the system executes a high-compute artificial neural network (e.g., such as a convolutional neural network or fully connected neural network) as the occupancy detection model. More specifically, the system or a training system cooperating with the system can train the occupancy detection model based on a corpus of occupancy training examples, each occupancy training example including a high-resolution image and a classification as occupied or vacant. Additionally, each training example can also include locations and orientations of humans and/or other objects of interest within a threshold distance of the workspace or within the image mask corresponding to the workspace. The system or the training system can then execute a supervised training algorithm (e.g., a backpropagation algorithm) in order to train the occupancy detection model, thereby resulting in a set of weights corresponding to each layer of the artificial neural network. The sensor block can then store these weights in local memory in order to execute the occupancy detection model.

In one implementation, in addition to classifying the occupancy of the workspace as either occupied or vacant, the system can execute an occupancy detection model that outputs additional data regarding the workspace such as a number and type of objects detected at or within a threshold distance of the workspace, the level of engagement of the human at the workspace, and/or the utilization rate of various resources at the workspace (e.g., a whiteboard, a desktop computer). Thus, the system can execute the occupancy detection model to provide deeper contextual data to users of the system regarding the utilization of workspaces in a work area in addition to providing a higher accuracy classification of the occupancy of each workspace.

In another implementation, in addition to executing the occupancy detection model in order to classify the workspace as either occupied or vacant, the system can also execute the occupancy detection model in order to classify the workspace as occupied, occupied with no human present, or vacant. More specifically, the system can execute a computer vision classification algorithm to detect an occupancy status of the workspace, the occupancy status being one of: occupied, vacant; or occupied with no human present. Thus, the system can, via execution of the occupancy detection model, distinguish between occupation of a workspace by a human currently working at the workspace; and occupation of a workspace by a set of human effects (e.g., personal items associated with a human such as items of clothing, laptops computers, tablets, smartphones, coffee mugs, pens, or any other object associated with the presence of a human). By distinguishing between occupation states in this regard, the system can provide additional contextual data to the remote scheduling system or to users of the system pertaining to the utilization of workspaces in the work area.

In yet another implementation, the system can execute the occupancy detection model on a consecutive pair of high-resolution images or on a series of consecutive images. In this implementation, prior images of the workspace may provide additional context for the occupancy detection model to detect the presence or absence of a human at the workspace.

In the remote execution variation, the gateway executes the occupancy detection model after receiving a transmitted higher-resolution image from the sensor block. Because the gateway is connected to a wired power source and includes a larger local memory, the gateway can execute a more computationally intensive (and therefore more accurate) computer vision classification algorithm as the occupancy detection model. Thus, the gateway can implement occupancy detection models including deeper artificial neural networks or other more computationally intensive machine learning algorithms to determine the occupancy status of each workspace within a higher-resolution image captured by a sensor block. If the gateway classifies a workspace as occupied via a remotely executed occupancy detection model, thereby confirming detection of human arrival by the arrival detection model, then the gateway transmits a prompt to the sensor block confirming that the workspace is occupied. The sensor block can then update occupancy status of the workspace accordingly. If the classification indicates that the workspace is still vacant, then the gateway transmits a prompt to the sensor block indicating that the sensor block has detected a false positive occupancy of the workspace and therefore the occupancy status of the workspace is not updated by the sensor block and continues to indicate that the workspace is vacant.

6.5 Model Feedback

In addition to confirming the occupancy status of a workspace via the occupancy detection model and based on higher-resolution images captured by the sensor block, the system can modify the arrival detection model in order to improve the accuracy of the arrival detection model based on feedback from the occupation detection model. Thus, the system can utilize successive outputs of the occupancy detection model as a ground truth for the arrival detection model and modify the arrival detection model accordingly.

Generally, the system can: execute the occupancy detection model to label a workspace in an image as either vacant or occupied; down-sample the higher-resolution image recorded by the sensor block to convert the image to a lower-resolution; and perform multiple versions of the arrival detection model to identify parameters for the arrival detection model that result in the most accurate classification of vacancy/occupancy for a particular workspace.

In one implementation, the system down-samples a template image of the workspace (e.g., an image where the workspace is known to be vacant) and compares the down-sampled template image to a set of down-sampled images in which the workspace has been labeled as occupied according to the occupancy detection model. The system can then perform various versions of the arrival detection model to calculate which version provides the most accurate classification of the down-sampled image as across the set of down-sampled images.

Alternatively, the system can execute a machine learning algorithm to determine the most significant pixels for threshold analysis and/or contiguous edge detection. More specifically, the system can: calculate a set of most significant pixels within the image mask based on previous executions of the arrival detection model and the occupancy detection model; and execute the arrival detection model based on the set of most significant pixels in the first image and the set of most significant pixels in the second image. In one implementation, the system can execute an elimination-based sensitivity analysis of down-sampled images of the workspace by selectively removing the same pixel from each down-sampled image and retraining the model on the modified images.

Upon selecting an effective local selection model and/or image mask for a particular workspace, the system can transmit this configuration information to the sensor block. In response, the sensor block can modify its arrival detection model and/or the image mask corresponding to a workspace according to the configuration information.

In another implementation, the system can implement a machine learning algorithm or search algorithm to determine a minimum resolution for the lower-resolution images at which the arrival detection model can still reliably (i.e. with greater than a threshold accuracy) detect occupancy of the workspace. For example, after identifying an effective arrival detection model, the system can perform the arrival detection model at various down-sampled resolutions until the arrival detection model fails to correctly identify the occupancy of the workspace in a threshold proportion of test images of the workspace. Upon calculating a minimum resolution for the lower-resolution images, the system can transmit the resolution information to the sensor block, which can configure the optical sensor of the sensor block to capture the lower-resolution images at the calculated resolution.

In one variation, the gateway can execute the aforementioned feedback algorithms in order to save battery energy at the sensor block because the aforementioned feedback algorithms can be computationally intensive. In this variation, the sensor block can periodically offload high-resolution images to the gateway for further evaluation. Upon generating an output of the feedback algorithm (i.e. model parameters, resolutions, most-significant pixel locations), the gateway can then transmit this output to the sensor block. The sensor block can then modify its local arrival detection model according to the received output of the feedback algorithm.

7. Departure Detection Mode

Figure 4:
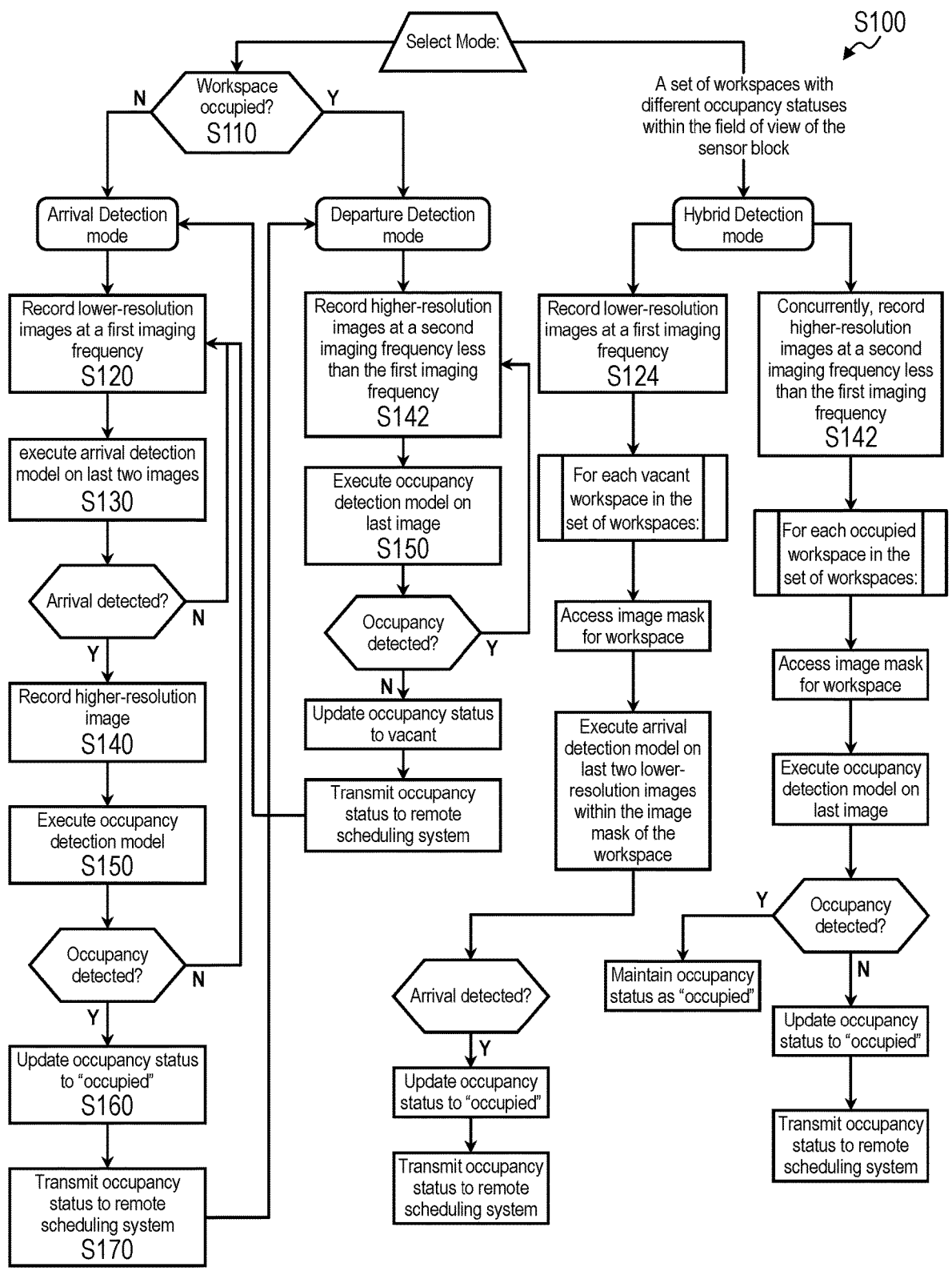
FIG. 4 is a flowchart representation of the method.

As shown in FIG. 4, the sensor block can operate in departure detection mode to: record successive higher-resolution images of the workspace at a lower frequency (when compared to the series of higher-frequency, lower-resolution images recorder in arrival detection mode; e.g., on a ten minute time interval); and execute the occupancy detection model based on each recorded higher-resolution image. Thus, the system can selectively decrease the temporal resolution in detecting departure of users from the workspace (i.e. by decreasing the imaging frequency of the sensor block relative to the higher imaging frequency of the sensor block in the arrival detection mode), while maintaining accuracy in classifying the occupancy of the workspace, thereby making available additional battery energy for when the sensor returns to arrival detection mode.

7.1 High-Resolution Image Capture and Transmission

Generally, while in departure detection mode, the sensor block captures a sequence of higher-resolution images and executes the occupancy detection model to detect a new vacancy of the current occupied workspace in the field of view of the sensor block. More specifically, the sensor block can record higher-resolution images (e.g., 640 by 480 or similar to the resolution of the confirmation images) at a lower imaging frequency as determined by an internal clock of the sensor block. The imaging frequency can be predetermined (e.g., a 10-, 15-, or 20-minute time interval) or can vary depending on the time of day, day of the week, historical utilization of the work area within the field of view of the sensor block, etc. Furthermore, the sensor block can periodically synchronize its clock with the gateway based on standard time synchronization protocols to synchronize the sensor block's capture of the higher-resolution images with other sensor blocks communicating with the same gateway.

In one implementation, upon confirming occupancy of the workspace via the occupancy detection model based on a first high-resolution confirmation image, the system can transition into departure detection mode by taking a second (higher-resolution) image succeeding the confirmation image by a second time interval corresponding to the lower imaging frequency of the sensor block in departure detection mode. More specifically, at a time succeeding the confirmation image time by a second time interval longer than the first time interval (between lower-resolution images), the system can: record a fourth (higher-resolution) image of the workspace at the sensor block; and execute the occupancy detection model based on the fourth image.

While operating in departure detection mode, the system can transition back into arrival detection mode in response to detecting a vacancy at a workspace in the field of view of the sensor block. When this occurs, the system can update the occupancy status of the workspace to indicate vacancy at the workspace and initiate arrival detection mode once again. More specifically, the system can, in response to detecting vacancy of the workspace via the occupancy detection model, record a series of lower-resolution images and execute the arrival detection model based on the series of lower-resolution images.

8. Adaptive Detection Mode

Figure 5:
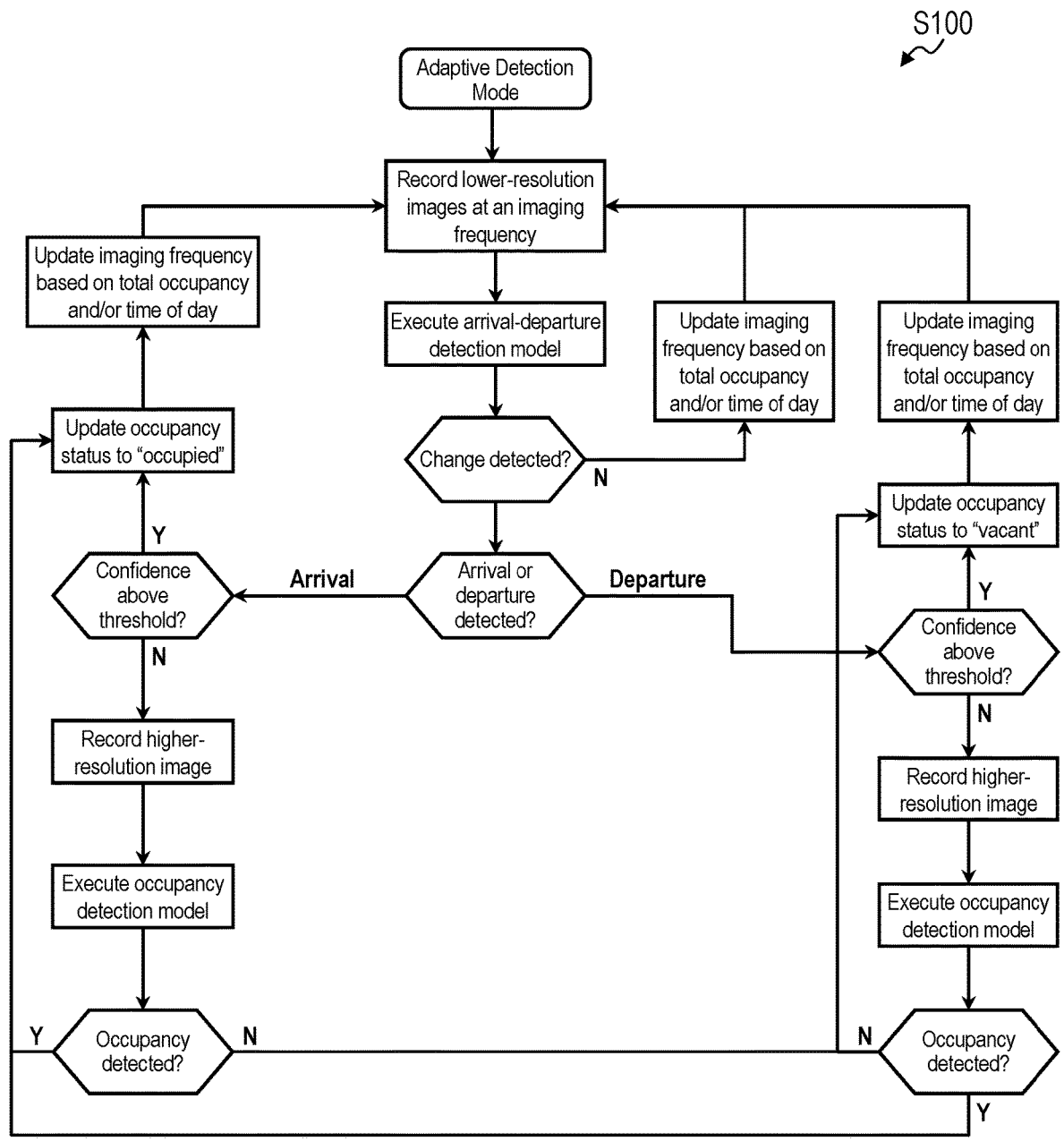
FIG. 5 is a flowchart representation of the method.
Figure 6:
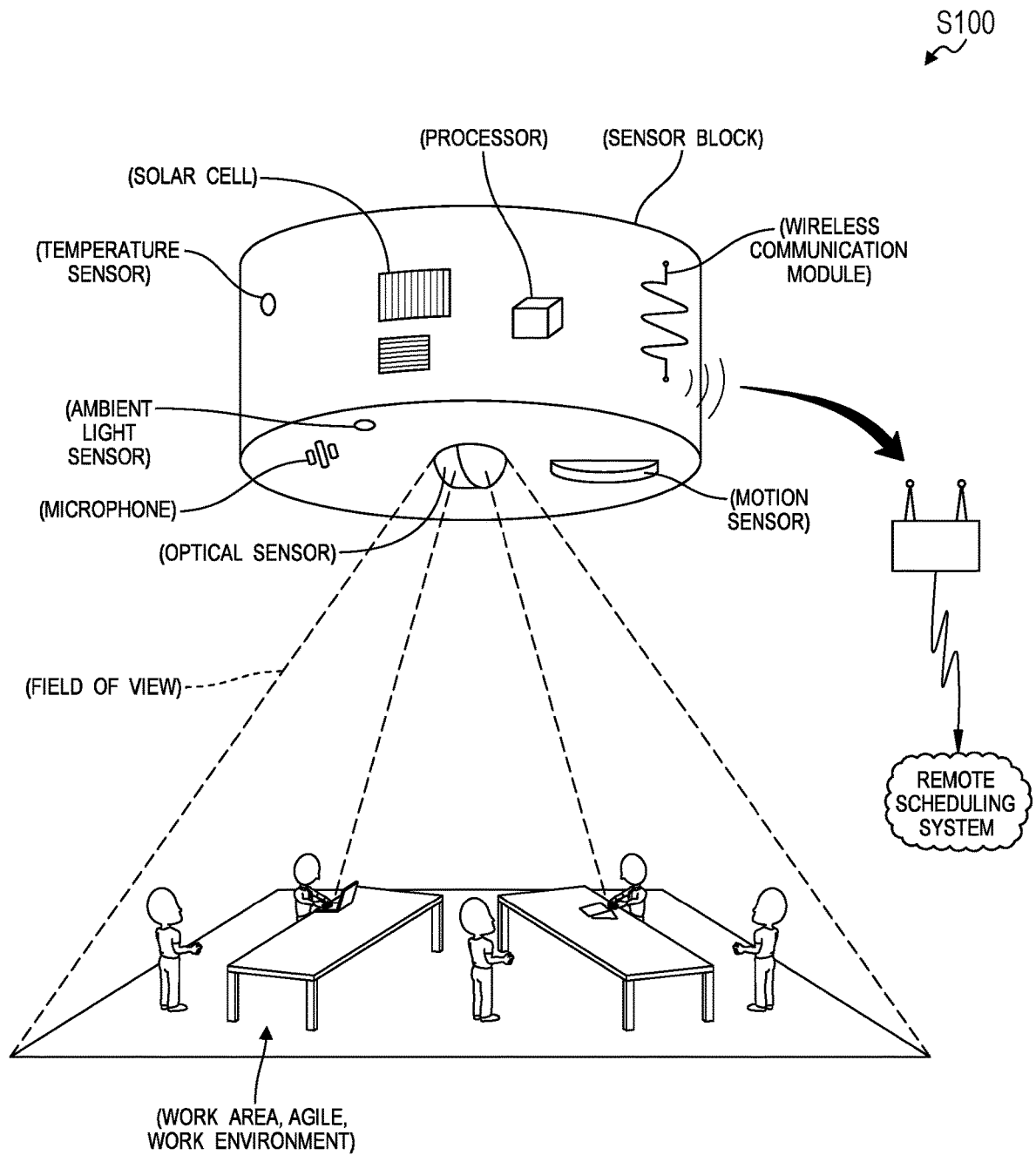
FIG. 6 is a schematic representation of the system.

As shown in FIG. 5, in one variation, the system can operate in an arrival-departure detection mode by continuing to record lower-resolution images and execute an arrival-departure detection model during departure detection mode, thereby saving additional battery energy when compared to recording a series of higher-resolution images and executing the occupancy detection model. More specifically, the system can record lower-resolution images at a lower imaging frequency than the imaging frequency in arrival detection mode and can execute the arrival-departure detection model based on each consecutive pair of lower-resolution images. Upon detecting departure via the arrival-departure detection model, the system can trigger the sensor block to record a higher-resolution confirmation image to confirm the departure and, if confirmed, successively update the occupancy status of the workspace. Thus, the system records lower-resolution images and executes the low-compute arrival-departure detection model and records higher-resolution images and executes the high-compute occupancy detection model in order to confirm changes (e.g., either detected arrival or departure) in occupancy detected by the arrival-departure detection model.

In one implementation of this variation, the system can also record higher-resolution images and execute the occupancy detection model in response to a confidence score for a detection (of either arrival or departure) of the arrival-departure detection model lower than a threshold confidence score.

In another implementation in this variation, the system can record a pair of lower-resolution images depicting multiple workspaces; and execute the arrival-departure model on each of these workspaces to detect either arrival or departure from these workspaces. Thus, the system can record higher-resolution images at times independent of the current occupancy status of workspaces that instead act as confirmation images of either arrival or departure of humans from workspaces within the field of view of the sensor block.

9. Hybrid Detection Mode

As shown in FIG. 4, in one implementation, if there are multiple workspaces within the field of view of the sensor block and the workspaces have different occupancy statuses, the sensor block can operate in a hybrid detection mode by executing Blocks of the method S100 according to both the arrival detection mode and the departure detection model. Generally, the sensor block accomplishes this by: capturing successive lower-resolution images at a first frequency (i.e. with a shorter intervening time interval) and capturing higher-resolution images at a second lower frequency (i.e. with a longer intervening time interval). More specifically, the system can access an occupancy status of a second workspace in a work area encompassing the first workspace and the second workspace. In response to the second occupancy status indicating vacancy of the second workspace, during the second time period succeeding the first time period, the system can: record a third series of images of a second workspace at the sensor block and at the first imaging frequency; execute the arrival detection model based on the third series of images; and detect human arrival at the second workspace via the arrival detection model. Thus, the model can simultaneously record a series of lower-resolution images at a higher frequency in order to detect arrival of a human at a vacant workspace while also recording a series of higher-resolution images at a lower-frequency in order to detect departure of a human from an occupied workspace.

Like the sensor block operating in arrival detection mode, the sensor block operating in hybrid detection mode executes the arrival detection model for each recorded lower-resolution image but only on pixels of the lower-resolution image within image masks corresponding to vacant workspaces. Thus, the sensor block conserves processing time (and therefore battery life) while executing the arrival detection model for the vacant workspaces within the lower-resolution images.

While operating in a hybrid mode, the sensor block detects departures from occupied workspaces by transmitting each recorded higher-resolution image to the gateway; and receiving a classification of the workspaces with occupancy statuses indicating that they are occupied. If the gateway returns a classification indicating vacancy, then the sensor block updates the occupancy status for the corresponding workspace. In one implementation, the sensor block can also update the occupancy status of a vacant workspace to indicate occupancy according to a classification from the gateway (e.g., in cases where the arrival detection model failed to detect an arrival at a workspace). Thus, by periodically transmitting higher-resolution images to be analyzed by the gateway the system can check the accuracy of the arrival detection model.

In this manner, the sensor block and the gateway can track arrivals of humans at vacant workspaces and the departure of humans from occupied workspaces within the same time period.

9.1 Scheduling

In one implementation, while operating in hybrid detection mode, the sensor block can record lower-resolution images and higher-resolution images according to a schedule instead of recording each sequence of images at a particular frequency. Generally, the sensor block can record successive lower-resolution images at a particular frequency and then replace a certain proportion of the lower-resolution images with higher-resolution images. For example, the sensor block can record a lower-resolution image every two minutes and record a higher-resolution image every fifth image (i.e. a higher-resolution image every ten minutes). Therefore, a higher-resolution image replaces a lower-resolution image every ten minutes and is evaluated via the occupancy detection model.

In one implementation, the system can increase or decrease the frequency of images in the schedule based on the time of day, thereby executing a daily schedule for recording lower-resolution and higher-resolution images. However, the system can schedule lower-resolution and higher-resolution image capture according to any daily or weekly schedule in order to manage battery energy consumption of the sensor block and to throttle the arrival time resolution and departure time resolution of the system relative to each other.

9.2 Transmission Limits

In the remote execution variation, when operating in arrival detection mode, the sensor block records and transmits a higher-resolution confirmation image in response to detecting an arrival via the arrival detection model and based on a last lower-resolution image. However, when operating in hybrid detection mode, the sensor block is configured to periodically record and transmit higher-resolution images in order to detect departures. Therefore, it can be redundant and therefore wasteful of battery energy for the sensor block to automatically trigger recording and transmission of a confirmation image. Thus, the sensor block can implement conditional logic when triggering the capture and transmission of a higher-resolution confirmation image to limit instances of redundant higher-resolution capture and transmission. Additionally or alternatively, the sensor block can record and transmit scheduled higher-resolution images based on conditional logic.

In one implementation, the sensor block records a number of higher-resolution images (including scheduled higher-resolution images and confirmation images) sent within a rolling time buffer (e.g., a 20-minute buffer). The sensor block can then cancel the capture and transmission of any scheduled higher-resolution images or triggered confirmation images when a threshold number (e.g., three) of higher-resolution images has been recorded within the rolling buffer. Furthermore, the sensor block can implement multiple durations of rolling time buffers, each with a different corresponding maximum number of higher-resolution image captures and transmissions. For example, the sensor block can implement: a first rolling buffer of two minutes with a first maximum number of higher-resolution images of one; a second rolling buffer of 10 minutes with a second maximum number of higher-resolution images of three; and a third rolling buffer of 20 minutes with third maximum number of higher-resolution images of four.

10. Adaptive Detection Mode

In one implementation, the system can operate in an adaptive detection mode where the sensor block can adaptively modify its imaging frequency in arrival detection mode and departure detection mode in order to prioritize arrival detection and/or departure detection while conserving battery energy of the sensor block. More specifically, the sensor block can store, in local memory, a lower-resolution imaging frequency function that takes as input a set of input data (e.g., the time of day, the current total occupancy of the work area) and outputs a lower-resolution imaging frequency. The sensor block can then record lower-resolution images of workspaces at the lower-resolution imaging frequency when operating in arrival detection mode. Additionally, the sensor block can store, in local memory, a higher-resolution imaging frequency function that takes as input the set of input data (e.g., the time of day, the current total occupancy of the work area) and outputs a higher-resolution imaging frequency; the sensor block can then record higher-resolution images at the higher-resolution imaging frequency when operating in departure detection mode.

In one example, the system can modulate the imaging frequency of a sensor block based on the time of day. More specifically, the system can: during the first time period, record a first series of images of a first workspace at the sensor block and at the first imaging frequency, the first imaging frequency based on the time of day of the first time period; and, during the second time period succeeding the first time period, record the second series of images of the first workspace at the sensor block and at the second imaging frequency, the first imaging frequency based on the time of day of the second time period. Thus, the system can increase the lower-resolution imaging frequency (for arrival detection) for time periods during which a large number of humans are arriving at a workspace (e.g., during the start of the workday such as between 7:00 AM and 9:00 AM) and decrease the lower-resolution imaging frequency for time periods later in the day during which there are fewer arrivals at the work area. Likewise, the system can increase the higher-resolution image frequency during time periods of frequent human departure from workspaces (e.g., during the end of the workday such as between 4:00 PM and 6:00 PM) or during time periods of high activity where additional metadata relevant to utilization of the work area may be available (e.g., during the working hours of the workday such between 9:00 AM and 12:00 PM and between 1:00 PM and 4:00 PM).

In another example, the system can modulate the imaging frequency based on the current total occupancy of the work area that includes a workspace within the field of view of the sensor block. More specifically, the system can access a set of occupancy statuses of a set of workspaces located in a work area, the set of workspaces including the first workspace; calculate a total occupancy of the work area; record the first series of images of the first workspace at the sensor block and at the first imaging frequency, the first frequency based on the total occupancy of the work area; and record the second series of images of the first workspace at the sensor block and at the second imaging frequency, the second imaging frequency based on the total occupancy of the work area. Thus, during periods of high occupancy, when there are few available workspaces in the work area, the system can increase the lower-resolution imaging frequency (for improved arrival detection) and can increase the higher-resolution imaging frequency (for improved departure detection), thereby improving the time resolution of occupancy statuses for the work area across the board in order to aid humans in locating desks that are not currently occupied. Additionally, during periods of low occupancy, the system can decrease the lower-resolution imaging frequency and decrease the higher-resolution imaging frequency, thereby conserving battery energy of the sensor block because humans may be able to select from a larger number of readily available vacant workspaces within the work area.

In yet another example, the system can modulate the imaging frequency of the sensor block based on the types of workspaces present within the field of view of the sensor block. For example, when the sensor block is located over a conference room, the system can increase the imaging frequency (lower-resolution and higher-resolution) of the sensor block in order to improve the arrival and departure time resolution of the sensor block for the relative high demand conference room. In another example, when the sensor block is located over a set of agile desks, the system can decrease the relative imaging frequency (lower-resolution and higher-resolution) since these desks are, on average, lower turnover workspaces than a conference room.

11. Remote Scheduling System and User Interface Representation

Generally, the system can transmit an indication of the occupancy status of a workspace to the remote scheduling system such that the remote scheduling system can display a GUI representation of the occupancy status of the workspace to users of the system in Block S170. More specifically, the system can transmit the occupancy status to a remote scheduling system upon confirming a workspace as occupied via the occupancy detection model, or upon detecting vacancy of a workspace via the occupancy detection model. Thus, by reporting the occupancy status of the workspace to the remote scheduling system, the system can communicate the occupancy status of the workspace to various users of the system who may then more effectively choose workspaces at which to work.

The remote scheduling system can communicate with a number of displays (e.g., tablet computers, smartphones, or video monitors) each displaying a GUI representing the occupancy statuses of workspaces in a work area. For example, the GUI can include a map of the work area depicting the position of individual workspaces within the work area. The GUI can also include an indication of the occupancy status of each workspace such as via a change in color (e.g., green representing a vacant occupancy status, red representing an occupied occupancy status) or via the presence or absence of a symbol (e.g., a presence of a human icon representing an occupied occupancy status, an absence of a human icon representing a vacant occupancy status). In an additional example, the GUI can include an indication of the most recent update to the occupancy status of each workspace (e.g., a timestamp of the latest image including each workspace on which the occupancy detection model was executed by the system).

Additionally, in response to detecting human arrival via the arrival detection model (i.e. prior to confirmation by the occupancy detection model) the system can modify the representation of the workspace in the GUI representing the work area. More specifically, in response to detecting human arrival at the workspace via the arrival detection model, the system can: transmit an indication of the human arrival at the workspace to the remote scheduling system and, at the remote scheduling system in response to receiving the indication of human arrival, represent the human arrival at the workspace with a first graphical representation in a user interface; and, at the remote scheduling system in response to receiving the occupancy status indicating occupancy of the workspace, represent the occupancy of the workspace with a second graphical representation in the user interface. Thus, the system can represent a detected arrival at a workspace that has yet to be confirmed by the system as occupancy of the workspace in the GUI. For example, the system can indicate that the workspace is occupied pending confirmation via a flashing red and green representation, thereby indicating that the workspace may be confirmed as occupied in the near future.

In one implementation, via the remote scheduling system, the system can represent an occupied with no human present state for workspaces in the work area (e.g., via a third color such as orange or yellow, or via an additional icon) in order to indicate that a workspace is occupied but not currently being used. Therefore, a user of the system may be able to locate the human that has left her personal items at the workspace and potentially occupy the workspace instead of this current occupant.

However, the system can represent the occupancy status and/or transitional states between occupancy statuses of workspaces in the work area in any other way.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting occupancy of a workspace comprising:
　accessing an occupancy status of the workspace;
　in response to the occupancy status indicating vacancy of the workspace:
　　at a first time, recording a first image of the workspace at a sensor block, the first image characterized by a first resolution;
　　at a second time succeeding the first time by a first time interval, recording a second image of the workspace at the sensor block, the second image characterized by the first resolution; and
　　executing an arrival detection model based on the first image and the second image;
　in response to detecting human arrival at the workspace via the arrival detection model:
　　at a third time, recording a third image of the workspace at the sensor block, the third image characterized by a second resolution greater than the first resolution; and
　　executing an occupancy detection model based on the third image; and
　in response to detecting occupancy of the workspace via the occupancy detection model:
　　updating the occupancy status to indicate occupancy of the workspace;
　　transmitting the occupancy status to a remote scheduling system;
　　at a fourth time succeeding the third time by a second time interval longer than the first time interval, recording a fourth image of the workspace at the sensor block, the fourth image characterized by the second resolution; and
　　executing the occupancy detection model based on the fourth image.

2. The method of claim 1:
wherein executing the arrival detection model based on the first image and the second image further comprises executing the arrival detection model based on the first image and the second image, the arrival detection model characterized by a first energy consumption; and
wherein executing the occupancy detection model based on the third image further comprises executing the occupancy detection model based on the third image, the occupancy detection model characterized by a second energy consumption.

3. The method of claim 1:
wherein accessing the occupancy status of the workspace further comprises accessing an occupancy status of the workspace at the sensor block;
wherein executing the arrival detection model based on the first image and the second image further comprises executing the arrival detection model based on the first image and the second image at the sensor block;
further comprising, in response to detecting human arrival at the workspace via the arrival detection model, transmitting the third image from the sensor block to a gateway;
wherein executing the occupancy detection model based on the third image further comprises executing the occupancy detection model based on the third image at the gateway;
further comprising, in response to detecting occupancy of the workspace via the occupancy detection model, transmitting an indication of occupancy of the workspace from the gateway to the sensor block;
wherein updating the occupancy status to indicate occupancy of the workspace further comprises updating the occupancy status to indicate occupancy of the workspace at the sensor block; and
wherein transmitting the occupancy status to the remote scheduling system further comprises transmitting the occupancy status from the gateway to the remote scheduling system.

4. The method of claim 1:
wherein recording the first image of the workspace at the sensor block further comprises recording the first image of the workspace at the sensor block via a first optical sensor;
wherein recording the second image of the workspace at the sensor block further comprises recording the second image of the workspace at the sensor block via the first optical sensor; and
wherein recording the third image of the workspace at the sensor block further comprises recording the third image of the workspace at the sensor block via a second optical sensor.

5. The method of claim 1:
further comprising accessing an image mask corresponding to the workspace, the image mask defining a subsection of the image occupied by the workspace;
wherein executing the arrival detection model based on the first image and the second image further comprises executing the arrival detection model based on the first image within the image mask and the second image within the image mask; and
wherein executing the occupancy detection model based on the third image further comprises executing the occupancy detection model based on the third image within the image mask.

6. The method of claim 5:
further comprising calculating a set of most significant pixels within the image mask based on previous executions of the arrival detection model and the occupancy detection model; and
wherein executing the arrival detection model based on the first image within the image mask and the second image within the image mask further comprises executing the arrival detection model based on the set of most significant pixels in the first image and the set of most significant pixels in the second image.

7. A method for detecting occupancy of a workspace comprising:
accessing an occupancy status of the workspace;
in response to the occupancy status indicating vacancy of the workspace:
at a first time, recording a first image of the workspace at a sensor block;
at a second time succeeding the first time by a first time interval, recording a second image of the workspace at the sensor block; and
executing an arrival detection model based on the first image and the second image, the arrival detection model characterized by a first energy consumption;
in response to detecting human arrival at the workspace via the arrival detection model:
at a third time, recording a third image of the workspace at the sensor block; and
executing an occupancy detection model based on the third image, the occupancy detection model characterized by a second energy consumption greater than the first energy consumption; and
in response to detecting occupancy of the workspace via the occupancy detection model:
updating the occupancy status to indicate occupancy of the workspace;
transmitting the occupancy status to a remote scheduling system, the occupancy status indicating occupancy of the workspace;
at a fourth time succeeding the third time by a second time interval longer than the first time interval, recording a fourth image of the workspace at the sensor block; and
executing the occupancy detection model based on the fourth image.

8. The method of claim 7, further comprising, in response to detecting vacancy of the workspace via the occupancy detection model based on the fourth image:
at a fifth time, recording a fifth image of the workspace at the sensor block;
at a sixth time succeeding the fifth time by the first time interval, recording a sixth image of the workspace at the sensor block; and
executing the arrival detection model based on the fifth image and the sixth image.

9. The method of claim 7:
wherein accessing the occupancy status of the workspace further comprises accessing the occupancy status of the workspace, in local memory of the sensor block;
wherein executing the arrival detection model based on the first image and the second image further comprises executing the arrival detection model based on the first image and the second image at the sensor block;
wherein executing the occupancy detection model based on the third image further comprises executing the occupancy detection model based on the third image at the sensor block;
wherein updating the occupancy status to indicate occupancy of the workspace further comprises updating the occupancy status to indicate occupancy of the workspace in the local memory of the sensor block; and
wherein transmitting the occupancy status to the remote scheduling system further comprises transmitting the occupancy status from the sensor block to the remote scheduling system.

10. The method of claim 7, wherein executing the occupancy detection model based on the third image further comprises executing a computer vision classification algorithm to detect an occupancy status of the workspace, the occupancy status being one of:
occupied;
vacant; and
occupied with no human present.

11. The method of claim 7, wherein executing the arrival detection model based on the first image and the second image further comprises, in response to a set of pixels values in an image mask corresponding to the workspace in the second image exceeding a first set of pixel value thresholds, detecting human arrival at the workspace.

12. The method of claim 7, wherein executing the arrival detection model based on the first image and the second image further comprises:
detecting a presence of the first contiguous edge in the first image; and
in response to detecting an absence of the first contiguous edge in the second image, detecting human arrival at the workspace.

13. The method of claim 7:
further comprising accessing a template image of the workspace; and
wherein executing the arrival detection model based on the first image and the second image further comprises:
generating a first difference image between the template image and the first image;
detecting a human arrival in the workspace based on the first difference image;

generate a second difference image between the template image and the second image; and
confirming the human arrival in the workspace based on the second difference image.

14. The method of claim 7, further comprising:
in response to detecting human arrival at the workspace via the arrival detection model:
transmitting an indication of the human arrival at the workspace to the remote scheduling system; and
at the remote scheduling system, in response to receiving the indication of human arrival, representing the human arrival at the workspace with a first graphical representation in a user interface; and
at the remote scheduling system, in response to receiving the occupancy status indicating occupancy of the workspace, representing the occupancy of the workspace with a second graphical representation in the user interface.

15. A method comprising:
accessing a first occupancy status of a first workspace;
in response to the first occupancy status indicating vacancy of the first workspace:
during a first time period, recording a first series of images of the first workspace at a sensor block and at a first imaging frequency; and
executing an arrival detection model based on the first series of images;
in response to detecting human arrival at the first workspace via the arrival detection model:
during a second time period succeeding the first time period, recording a second series of images of the first workspace at the sensor block and at a second imaging frequency less than the first image frequency; and
executing an occupancy detection model based on the second series of images; and
in response to detecting occupancy of the first workspace via the occupancy detection model:
updating the first occupancy status to indicate occupancy of the first workspace; and
transmitting the first occupancy status to a remote scheduling system.

16. The method of claim 15:
wherein, during the first time period, recording the first series of images of the first workspace at the sensor block and at the first imaging frequency further comprises, during the first time period, recording the first series of images of the first workspace at the sensor block and at the first imaging frequency, the first imaging frequency based on the time of day of the first time period; and
wherein, during the second time period succeeding the first time period, recording the second series of images of the first workspace at the sensor block and at the second imaging frequency further comprises, during the second time period succeeding the first time period, recording the second series of images of the first workspace at the sensor block and at the second imaging frequency, the first imaging frequency based on the time of day of the second time period.

17. The method of claim 15:
wherein accessing the first occupancy status of the first workspace further comprises accessing a set of occupancy statuses of a set of workspaces located in a work area, the set of workspaces comprising the first workspace;
further comprising calculating a total occupancy of the work area;
wherein recording the first series of images of the first workspace at the sensor block and at the first imaging frequency further comprises recording the first series of images of the first workspace at the sensor block and at the first imaging frequency, the first frequency based on the total occupancy of the work area; and
wherein recording the second series of images of the first workspace at the sensor block and at the second imaging frequency further comprises recording the second series of images of the first workspace at the sensor block and at the second imaging frequency, the second imaging frequency based on the total occupancy of the work area.

18. The method of claim 15, further comprising:
accessing a second occupancy status of a second workspace in a work area encompassing the first workspace and the second workspace; and
in response to the second occupancy status indicating vacancy of the second workspace:
during the second time period succeeding the first time period, recording a third series of images of a second workspace at the sensor block and at the first imaging frequency; and
executing the arrival detection model based on the third series of images; and
detecting human arrival at the second workspace via the arrival detection model.

19. The method of claim 15, further comprising:
accessing a second occupancy status of a second workspace;
in response to the second occupancy status indicating vacancy of the second workspace:
during a third time period, recording a third series of images of the second workspace at the sensor block and at the first imaging frequency; and
executing the arrival detection model based on the third series of images;
in response to detecting human arrival at the second workspace via the arrival detection model, during a fourth time period succeeding the third time period, recording a second series of images of the second workspace at the sensor block and at the second imaging frequency;
executing the occupancy detection model based on the fourth series of images; and
in response to detecting vacancy of the second workspace:
maintaining the second occupancy status to indicate vacancy of the second workspace; and
recording a fifth series of images of the second workspace at the sensor block and at the first imaging frequency.

* * * * *